Nov. 1, 1966   R. A. LEHMKUHL ET AL   3,281,934
SPINDLE OSCILLATOR FOR TOOL CHANGER APPARATUS
Filed Feb. 24, 1964   4 Sheets-Sheet 1
FIG. 1
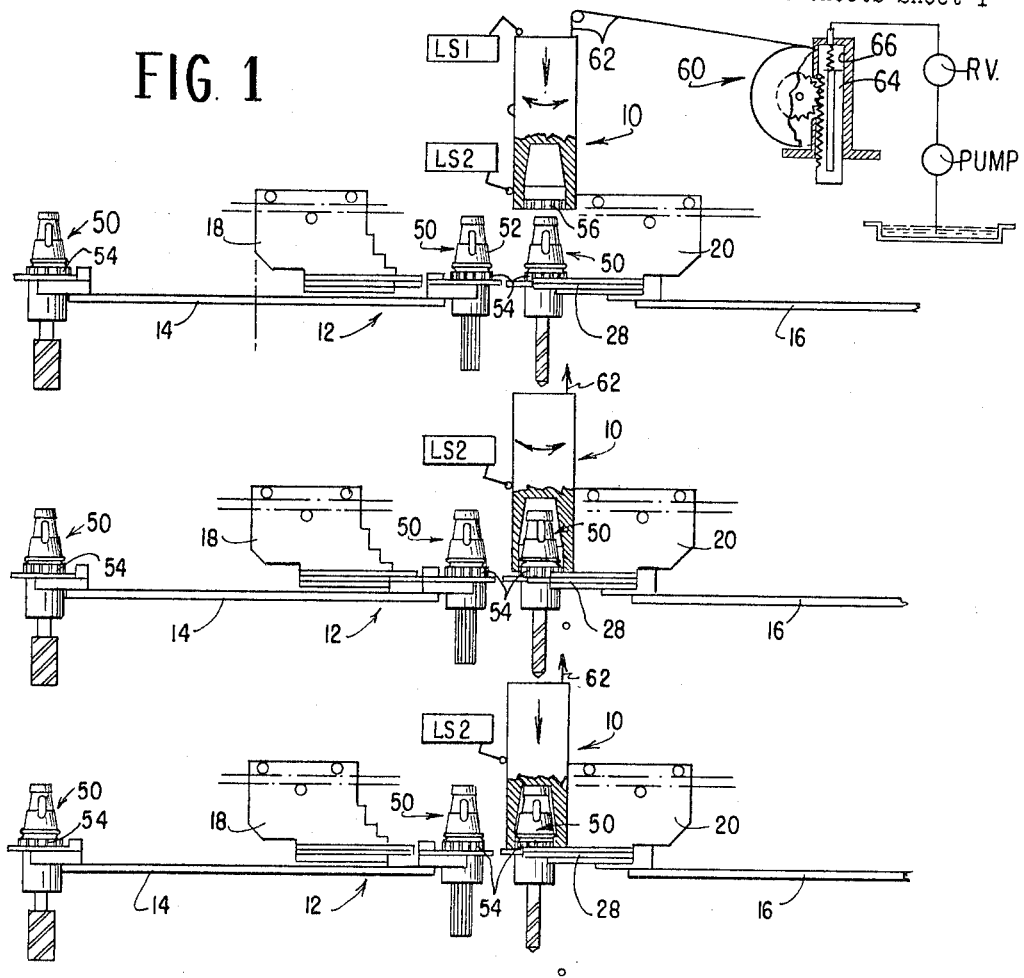
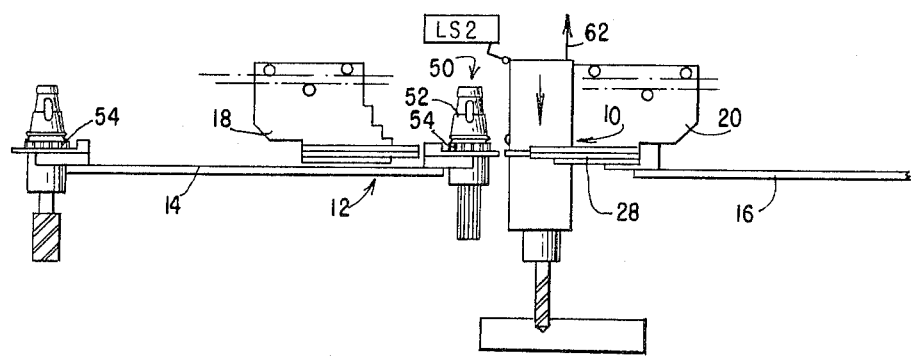
Inventors
Robert A. Lehmkuhl
Jack A. Wohlfeil
By Wolfe, Hubbard, Voit & Osann Attys.

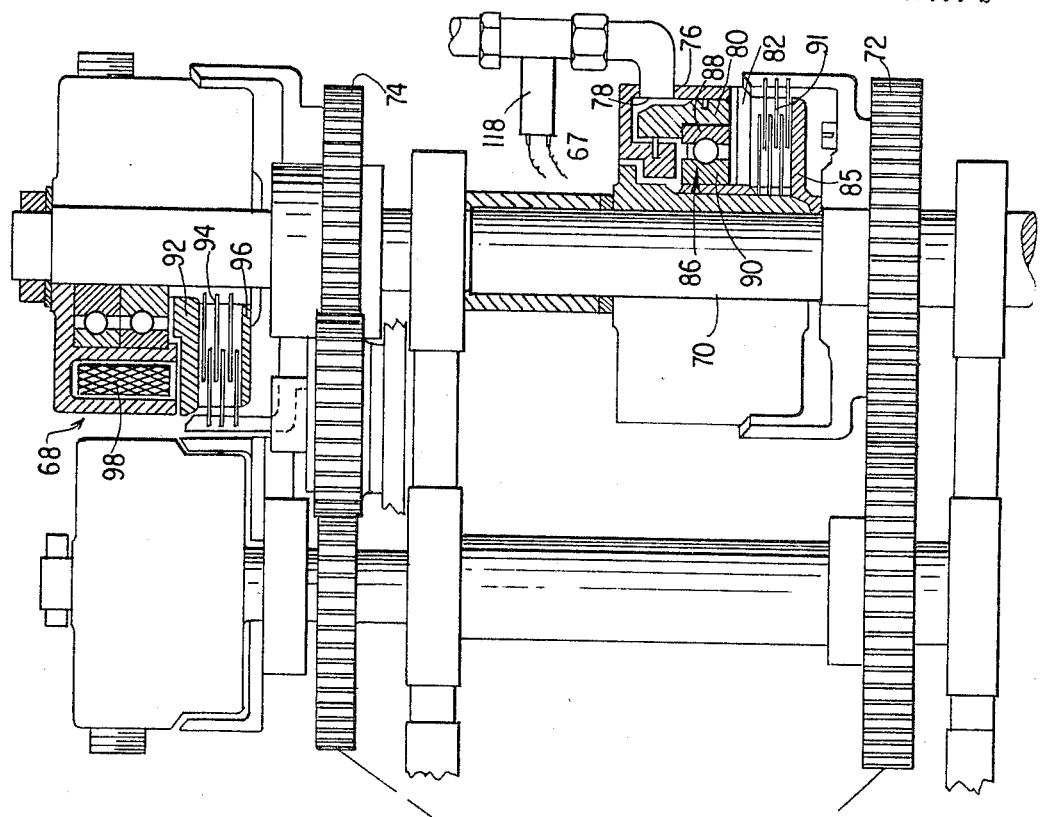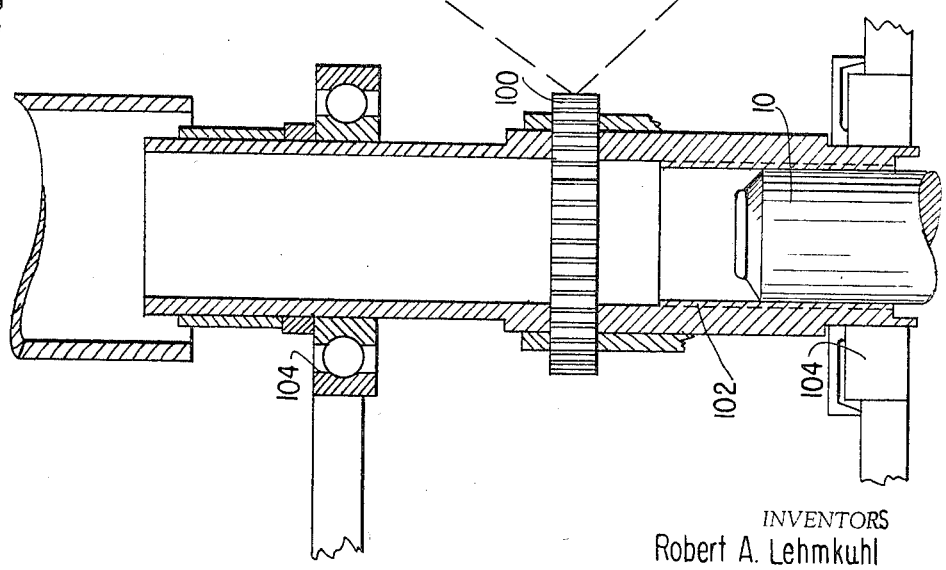

INVENTORS
Robert A. Lehmkuhl
Jack A. Wohlfeil
BY
Wolfe, Hubbard, Voit & Osann
Attys.

Nov. 1, 1966 R. A. LEHMKUHL ET AL 3,281,934
SPINDLE OSCILLATOR FOR TOOL CHANGER APPARATUS
Filed Feb. 24, 1964 4 Sheets-Sheet 4
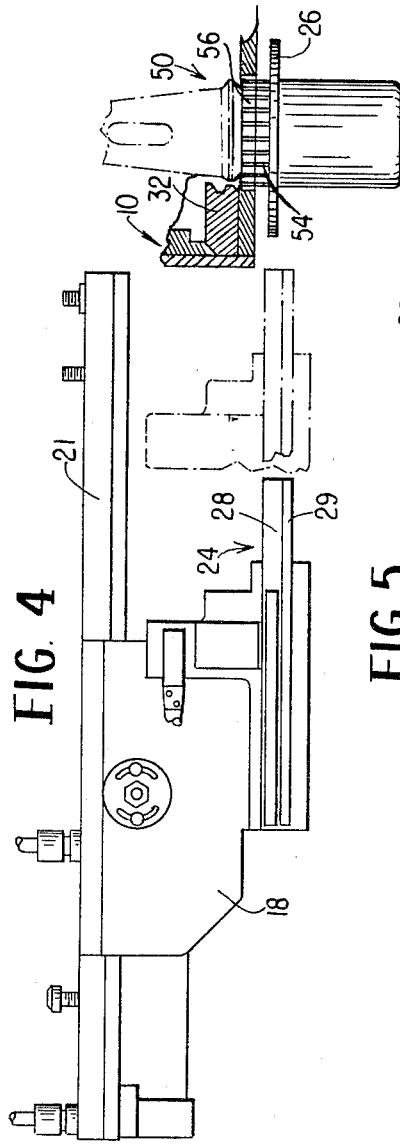
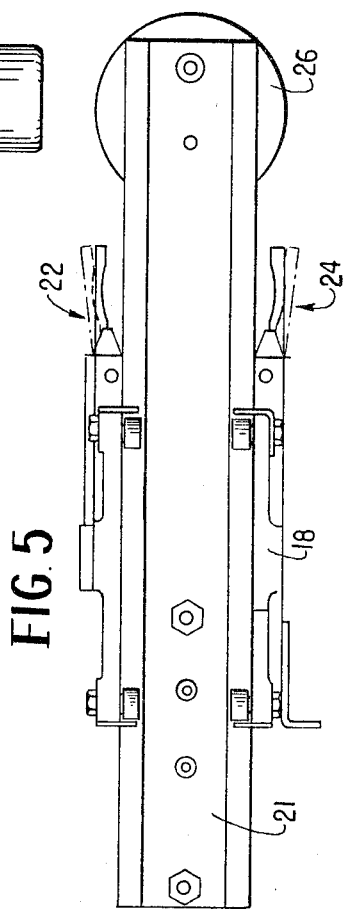
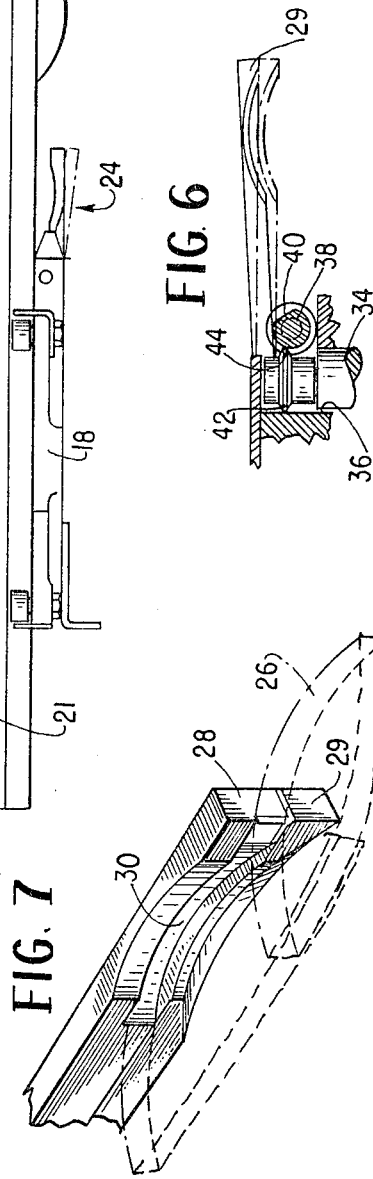
INVENTORS
Robert A. Lehmkuhl
Jack A. Wohlfeil
BY
Wolfe, Hubbard, Voit & Osann
Attys.

United States Patent Office 3,281,934
Patented Nov. 1, 1966

3,281,934
SPINDLE OSCILLATOR FOR TOOL CHANGER APPARATUS
Robert A. Lehmkuhl, Appleton, and Jack A. Wohlfeil, Fond du Lac, Wis., assignors to Giddings & Lewis Machine Tool Company, Fond du Lac, Wis., a corporation of Wisconsin
Filed Feb. 24, 1964, Ser. No. 346,690
5 Claims. (Cl. 29—568)

This invention relates to machine tools and more particularly to apparatus for mechanically changing tools in machine tool spindles where the spindle member has means that mate with means on the tool member to secure positive drive engagement therebetween.

It has been found that without provision for orienting the spindle member or tool member as they are brought into association so as to exactly register the mating elements, interference prevents or slows full engagement. The main object of the present invention is to provide means for securing immediate full engagement even where the drive elements are brought only into approximate register.

Another object is to secure quick, full engagement of the spindle and tool members, by having the drive elements locate themselves for full engagement.

Another object is to secure quick, full mating engagement of the drive elements without damaging the latter.

A further object is to provide for offering the tool to the spindle and delivering it thereto without delay and without dropping the tool.

Other objects and advantages will appear from the following description taken in connection with the accompanying drawings, wherein:

FIGURE 1 is a diagrammatic view illustrating in succeeding stop motion views delivery of a tool to the spindle of a machine including provision for securing full mating engagement of drive elements on the tool and spindle members respectively;

FIG. 2 is a fragmentary vertical sectional view with parts shown in elevation of the transmission train to the machine spindle;

FIG. 4 is a fragmentary side elevational view of the shuttle and supporting trackway for delivery of tools to the spindle;

FIG. 5 is a fragmentary top plan view of the machine elements shown in FIG. 4;

FIG. 6 is an enlarged fragmentary view with parts broken away to show the actuators for the tool gripping arms on the shuttle; and FIG. 7 is a perspective view of the preferred form for the tool gripping arms of the shuttle.

Figure 3:
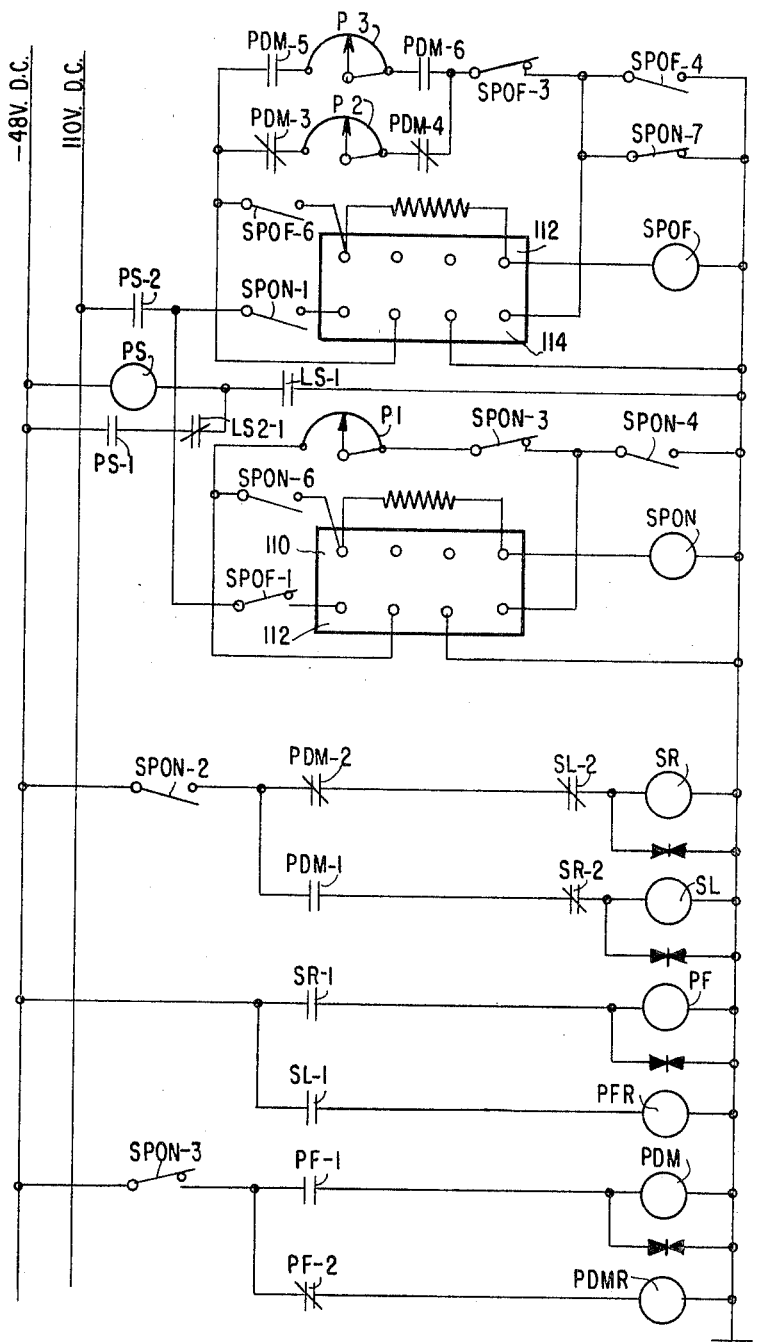
FIG. 3 is a schematic view of the control circuit for the transmission of FIG. 2.

While the invention is susceptible of various modifications and alternative forms, certain specific embodiments thereof are shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

This invention has particular but not exclusive utility applied to a machine tool having a vertically movable spindle 10, as illustrated diagrammatically in FIG. 1. This machine tool includes mechanical tool changing apparatus 12 for replacing cutting tools in the spindle 10 of the machine with tools removed from storage apparatus for such tools, herein shown as dual, horizontally mounted, matrices 14, 16. More specific details of a machine of this type may be obtained from Robert A. Lehmkuhl application, Serial No. 219,538, filed August 27, 1962, now Patent No. 3,200,492 entitled Multiple Use Machine with Tool Changer, but in general such machine includes a vertically movable, rotatable spindle 10, dual, horizontally mounted, rotatable tool storage drums or matrices 14, 16, straddling the vertical spindle 10 and providing for tool storage, and horizontally movable tool carrying shuttles 18, 20 for transferring tools between the spindle 10 and either matrix 14, 16. In addition to these elements, the machine includes a workpiece support movable by power along two axes. With this combination of a movable workpiece support and vertically movable spindle, by suitable control of these members various machining operations, such as light milling, may be carried out as well as conventional drilling and tapping operations.

Referring to FIG. 1, to shorten the cycle-time of tool changing operations with this machine, tools are transferred alternately from the matrices 14, 16 to the spindle 10. For this purpose, a horizontally movable shuttle 18, 20 is provided for each matrix 14, 16. The tools are held in vertical position in the matrices, being equally spaced about the periphery of the latter in individual sockets. The matrices are rotatably driven to locate any particular tool in a matrix in a transfer station or position immediately opposite the spindle, the shuttles being carried by a horizontal trackway 21 (FIG. 4) which is aligned with the spindle and provides means for supporting a shuttle for movement along a straight horizontal path to pick up a tool located at the transfer station and to carry the same to a position in alignment with the spindle, as shown in FIG. 4. With this arrangement it becomes possible to control the tool change cycle so that one shuttle returns the tool in the spindle to one matrix while the other shuttle transfers a new tool from the other matrix to the spindle.

At the start of a series of machining operations where the spindle 10 is initially empty of any tool, the matrix 14 or 16 having the first tool to be transferred to the spindle is rotated to the particular angular position where the first tool is located at the transfer station. The shuttle associated with that matrix, for example the left-hand matrix 14 as viewed in FIG. 1, then delivers the first tool to the spindle. In the succeeding tool changing operation, the first tool is returned from the spindle to the left-hand matrix, and the new tool transferred from either matrix to the spindle.

It is to be noted, however, that one of the features of this tool changing apparatus is the provision of dual matrices 14, 16 so that tools may be taken alternately from one and then the other matrix, shortening the overall period of the tool change cycle because the shuttles 18, 20 may be moved simultaneously.

For example, as shown in step 1 of FIG. 1, both shuttles are being employed for simultaneous transfer of a new tool from the right-hand matrix 16 to the spindle 10 by one shuttle 20, and return by the other shuttle 18 of the tool used in the previous machining cycle to the left-hand matrix 14. The next subsequent tool change cycle may involve search of the left-hand matrix, during the prior machining step, and transfer of the selected tool from such left-hand matrix to the spindle.

Still referring to FIG. 1, step 1 shows the spindle 10 at the limit of its upward travel within its headstock, and at that position it trips a limit switch LS1 which causes the spindle to move downwardly via the control means. After the spindle 10 in its upward movement cleared the old tool, the shuttle 18 moved the latter to the left-hand matrix 14. Simultaneously, the new tool is carried forward by the right-hand shuttle 20 to the spindle transfer position in axial alignment with the spindle.

In the course of forward movement of the shuttle from its retracted position, the gripping arms 22, 24 on the shuttle embrace the flange 26 of a tool carried in the matrix at the transfer station.

In the preferred form of these gripping arms 22, 24, as illustrated in FIGS. 4–7, each arm is constructed of two separate elements 28, 29 mounted in superposed adjacent relation to project forward from the shuttle. The upper element 28 is more rigid than the lower element 29 which is somewhat limber to allow it to flex outwardly in the coures of pick up and release of tools. Opposite recesses 30 are formed in the arms for receiving a flange 26 on the tools, the lower element 29 presenting a shoulder on which the tool flange 26 rests. With this construction of the gripping arms, initial engagement by the arms with the flange 26 causes the lower elements 29 of the arms to spring apart until the flange is received within the opposite recesses 30 in the arms. At this point in the forward advance of the shuttle, a latch mechanism (not shown) in the matrix is released, thereby to release a tool for movement forward to the spindle.

To insert the tool into the spindle socket, the spindle 10 is lowered as shown in steps 1 and 2 of FIG. 1. When the tool is received in the spindle socket, as shown in step 3 of FIG. 1, a power chuck in the spindle is operated to engage the jaws 32 (FIG. 4) with the tool and thereby clamp the tool in the spindle.

It will be appreciated that the construction of the gripping arms 22, 24 of the shuttle, wherein the lower elements 29 of such arms are flexible, eliminates the necessity of operating such gripping arms by power means to engage the tools. Provision for power actuation of such arms 22, 24 to release the tool is illustrated in FIG. 6 which is a view looking upwards from below the arms. In this case, power actuation is provided by a pair of opposed air actuated pistons 34, one only of such pistons being shown in FIG. 6 but the opposite one being similarly constructed. Such pistons 34 are received in a horizontal cylinder 36 defined in the body of the respective shuttle and located a substantial distance above the gripping arms 22, 24. Movement of each piston 34 is conveyed to actuate the associated lower gripping element 29 by a vertical rod 38 which is journalled in the side of the shuttle. The rod 38 is relieved to clear the upper gripping element 28. It also has a flat 40 forming a cam adapted to engage the lower gripping element 29 and move the same upon rotation of the rod.

In the present case the rod 38 is adapted to be oscillated through an angle of approximately 60° by the associated actuating piston 36. Each piston is provided with a land 42 which is received in a cut-out section 44 of a ring fixed to the motion transmitting rod 38 to provide a connection which translates motion of the piston to oscillation of the rod.

Upon admission of pressure fluid between the pistons 34, the latter will be forced outwardly thereby causing the lower set of gripping arm element 29 to be power spread as shown in broken lines in FIGS. 5 and 6. By opening the tool gripping arms in this manner, the tool in one shuttle is released to the spindle so that the latter may move downwardly to machine the workpiece.

According to a preferred form of the invention, the cutting tools are removably carried within tool adaptors 50 each including the tool flange 26 with which the tool is gripped by the shuttle arms, and a tapered shank 52 which is received in the spindle socket. A further feature of the adaptor 50 is the provision of external teeth 54 adjacent the flange 26 and adapted to mate with internal teeth 56 in the end of the spindle (FIG. 4) to provide positive driving engagement between the spindle and the tool.

One of the problems that has been found in operating this machine so as to obtain as quick a tool change as possible arises because of difficulty in securing full engagement of the tool in the spindle socket including mating engagement of the teeth 54 on the tool with the teeth 56 on the spindle. With a tool held stationary by one shuttle, and the spindle moving downward to engage the tool, the teeth may be partially out of mesh so that the teeth on the spindle fall onto the teeth on the tool and jam to prevent engagement. Heretofore, this problem has been alleviated by orienting the tool and spindle with respect to each other, but provisions for mechanical orientation have been complex and time consuming so that the result has been a slower tool change cycle. Extra time consuming operations are intolerable on production machines where loss of even a few seconds for each operation is considered significant.

Accordingly, in carrying out the present invention, provision is made for securing immediate mating engagement between the spindle teeth and the tool teeth, without positive orientation of these members, and as an incident to the downward vertical movement of the spindle to engage the tool.

To this end, downward movement of the spindle 10 is hydraulically controlled by means herein shown as a hydraulic counterbalance 60 for the spindle. The counterbalance 60 in the present instance includes a cable 62 leading to a piston 64 in a hydraulic cylinder 66. The fluid pressure in the cylinder 66 is under adjustable control by means of a regulator valve RV to secure underbalanced, balanced or overbalanced conditions. Full details of a counterbalance of this type are in Reichert et al. application, Serial No. 136,703, filed September 5, 1961, now Patent No. 3,151,505. In carrying out the present invention, for downward movement of the spindle in the tool change cycle, the spindle weight is slightly underbalanced so that the spindle tends to fall rapidly down toward the tool. In the event the teeth on the members are out of mesh, no damage will be done to the teeth since the spindle is not positively power fed, and the degree of underbalance is set so that the spindle falls lightly onto the tool without undue impact.

Furthermore, during its downward movement, the spindle is started to continuously oscillate so that as the spindle teeth 56 come into engagement with the teeth 54 on the tool, on the advance or return oscillations these teeth will be brought into register and, by continuing the hydraulic control over the spindle such that the spindle weight is underbalanced, the spindle will tend to move downward to cause the teeth on the spindle to fall into meshing engagement with the teeth on the tool.

The spindle is started oscillating at the limit of its upward travel where it immediately drops toward tool engagement. During this stage of operation, the spindle is under the counterbalance control illustrated in FIG. 1, wherein the fluid pressure in the counterbalance cylinder is regulated to underbalance the spindle weight. The conventional geared power feed is declutched from the spindle until after the tool has been transferred to and has been fully engaged within the spindle.

In keeping with the invention, oscillation of the spindle is caused by timed pulses which engage the power transmission to drive the spindle alternately through forward and reverse clutches 67, 68. How this is achieved will be explained in connection with the transmission for the spindle, shown in FIG. 2, and a suitable control circuit for the forward and reverse transmission clutches, shown in FIG. 3.

Referring to FIG. 2, an input shaft 70 from the spindle drive motor drives output forward and reverse gears 72, 74 through either the forward clutch herein shown as a hydraulic clutch 67, or a reverse clutch, herein shown as an electric clutch 68. Taking clutch 67 as an example, the clutch housing 76 is fixed to the machine and encloses a cylinder 78 having an annular piston 80 therein. A disc type clutch is shown with a drive plate 82 splined to the input shaft 70 and movable by the hydraulic piston 80 to press the clutch discs into engagement with an output plate 85 fixed to the output gear 72. A thrust transmitting bearing 86 having an outer race 88 connected to the clutch piston 80 and an inner race 90 slidable on the input shaft 70 and bearing against the input plate 82 of the clutch, is provided for transmitting force from the piston to engage the clutch by pressing the input plate against the discs 91 and output plate.

The electric clutch 68 is arranged in a similar manner. In this case, the input shaft 70 is connected to the reverse output gear 74 through a drive clutch plate 92, the discs 94, and an output clutch plate 96 which is fixed to the output gear. The drive clutch plate 92 serves as an armature for clutch windings 98, and is moved into engagement with the clutch discs upon energizing the clutch windings.

Power is transmitted to rotate the spindle from either the forward or reverse output gears 72, 74 through the transmission which connects the latter to a drive gear 100 on the spindle sleeve 102. In the present case, the spindle 10 is vertically movable within the spindle sleeve, being splined or otherwise slidably mounted within the sleeve for rotation therewith while being relatively axially movable. The sleeve 102 is supported by bearings 104 in the frame of the machine so that the sleeve is rotatable but fixed axially. The counterbalance 60 is connected by any suitable means to the spindle, a diagrammatic illustration of the connection being shown in FIG. 1.

To oscillate the spindle 10, in keeping with the invention, the forward and reverse clutches 67 and 68 are successively alternately engaged by time controlled means. Referring to FIGS. 1 and 3, the spindle is started oscillating responsive to tripping the limit switch LS1 at the limit of the upward travel of the spindle, which also places the spindle under hydraulic control of the counterbalance 60. In the present instance when the upper limit switch LS1 is tripped, a pulse-start relay PS is energized and latched in when its latching contacts PS-1 are closed. A second set of normally open contacts PS-2 of the pulse-start relay PS when closed start the timing cycle. The cycle of forward and reverse oscillations is timed by two timing units 112, 114 which control the forward and reverse clutches 67, 68 of the transmission via relays SR and SL respectively. With relay SR energized, the forward clutch is engaged through a solenoid valve 118 controlled by the relay SR. With relay SR deenergized and the other relay SL energized, the forward clutch 67 is disengaged and the reverse clutch 68 engaged by energizing its windings 98.

One of the features of the invention is that the oscillations of the spindle are timed and the periods between alternate directions of motion are also timed to leave discrete periods where the spindle is stopped. By coming to discrete periods of rest between motions, adequate time is provided for the drive elements on the spindle to fall into mesh with the drive elements in the tool if they are in proper register. If the spindle is merely jiggled, by rapidly oscillating the spindle, without delay between alternate directions of motions, it has been found that the drive elements either fail to mesh or are slow to mesh.

In keeping with the present invention, timing units 112, 114 in the control circuit are provided to time both the period that the clutches are engaged and the period of disengagement between alternate directions of oscillation. The timing units 112, 114 each are connected to potentiometers P1, P2, P3 which are provided for adjustment of the period between the application of potential to the input terminal of the unit and the appearance of a pulse at the output terminal of the unit. Arrow-Hart & Hegeman RC circuit type TE time delay relays may be used for the timing units 112, 114 of the control circuit of FIG. 2.

One potentiometer P1 is included in the first timing unit 112 to provide adjustment of the period between forward and reverse motions of the spindle. Two potentiometers P2, P3 are connected to the second timing unit 114 to provide adjustment for the time of the forward and reverse motions themselves. It will be observed that the transmission, as shown in FIG. 2, includes a hydraulic forward clutch 67 and an electric reverse clutch 68, the dynamics of operation of which are different. The electric clutch 68 provides faster response than the hydraulic clutch 67 and thus requires a shorter on-time pulse from means in the output of the timing unit 114. The two potentiometers P2 and P3 are provided for adjusting the length of the output pulse and thus the advance and return motions respectively while accounting for the particular response characteristics of both clutches 67, 68 employed in the transmission.

In the operation of the control, when the pulse-start relay contacts PS-2 are picked up, potential is applied from the 110 volt bus through the normally closed contacts SPOF-1 to the spindle pulse timing unit 112. After a time period according to the setting of its potentiometer P1, an output pulse is conveyed to the spindle-on relay SPON. By picking up its contacts SPON-2, the spindle-on relay energizes the forward clutch relay SR to engage the forward clutch 67, and also energizes via SPON-1 the timing unit 114. The spindle is oscillated in the forward direction for the period until the timing unit 114 conveys a pulse to the relay SPOF. With the latter energized, its normally closed now open contacts SPOF-1 deenergizes the timing unit 112. In turn, the SPON relay drops out, and its contacts SPON-1 in the input to the other timing unit 114 drops out and deenergize that timing unit and its relay SPOF.

In the course of the preceding described cycle, the forward clutch relay SR was energized and caused the self-latching PF relay to be latched via the contacts SR-1. In the next cycle, the circuit remembers the direction of the last oscillation through a pulse direction memory self-latching relay PDM which is latched up by the normally closed contacts SPON-3, and the normally open now closed contacts PF-1. During this next cycle, when the first timing unit 112 times out and energizes its output relay SPON, because of the closed contacts PDM-1 the reverse relay SL is energized to engage the reverse clutch 68 of the spindle transmission. The length of time of operation of the second timing unit 114 until its output relay SPOF is energized to drop out both timing units is adjustable by means of the potentiometer P2 or P3, depending on whether the relay PDM is latched or unlatched and thus the circuit adjusts the time of forward and reverse motions. The circuit also includes means for resetting both the forward direction relay PF and the direction memory relay PDM herein represented as reset coils PFR and PDMR for such relays, so that the state of such relay PF and PDM continuously represents the direction of motion of the spindle.

The relays SPON and SPOF in the output of the timing units 112, 114 respectively, are sequentially energized and are latched in once energized by latching contacts SPON-6 and SPOF-6 until dropped out when the other relay, either SPON or SPOF, is energized, via the contacts SPOF-1 and SPON-1 which disconnect the timing units 112, 114 from the power bus.

The potentiometer P1 is connected across terminals of the timing unit 112 to perform its time delay adjustment function until the output relay SPON is energized and opens its contacts SPON-3 in the circuit of the potentiometer P1 whereupon the timing unit is connected to ground through the contacts SPON-4 of the output relay.

One or the other of the potentiometers P2, P3 is connected aacross terminals of the timing unit 114 to perform its time delay adjustment function until the output relay SPOF is energized and opens the contacts SPOF–3 in the circuit of the potentiometers P2, P3 whereupon the timing unit is connected to ground through the contacts SPOF–4 of the output relay.

The spindle oscillations are continued, a typical cycle involving one-quarter second motion in the forward direction, one-half second between motions, and one-quarter second reverse motion, although the latter may be adjusted as desired to suit the particular gear ratio applicable to drive the spindle, until the spindle teeth 56 fall into mesh with the tool teeth 54 and the spindle drops to a posiiton of full engagement with the tool. Responsive thereto, a limit switch LS2 is tripped, opening its normally closed contacts in the latching circuit for the relay PS and thus deenergizing the latter.

With relay PS deenergized, its contacts PS–2 will drop out, deenergizing the timing circuit and stopping the spindle oscillations.

Further functions of the second limit switch LS2 are to actuate the power chuck in the spindle, by supplying air under pressure to the piston 140 of the chuck which moves the chuck jaws 32 into engagement with the shank of the tool in the spindle; and to open the gripping arms on the shuttle to release the tool and spindle for movement downward toward workpiece engagement by supplying air to the pistons 34. Thus the tool is gripped between the shuttle arms until fully engaged in the spindle and then released. In this manner, the tool is held positively during all stages of tool change by either means on the shuttle or by means on the spindle, to avoid dropping the tool.

We claim as our invention:

1. In a machine tool including an axially movable, rotatable spindle adapted to receive a cutting tool, said spindle and cutting tool having a multiplicity of closely spaced mating drive elements respectively, and the combination comprising, power means for mechanically changing tools in said spindle including means for holding a tool in alignment with said spindle for insertion therein upon relative axial movement therebetween, means for oscillating said spindle with periods of delay between periods of motion as an incident to said relative axial movement of said spindle and said tool to secure mating engagement of said drive elements, and means for controlling said oscillations including means for selectively timing said periods of motion and for timing said periods of delay.

2. In a machine tool including an axially movable, rotatable spindle adapted to receive a cutting tool, said spindle and cutting tool having a multiplicity of closely spaced mating drive elements respectively, and the combination comprising, power means for mechanically changing tools in said spindle including means for holding a tool in alignment with said spindle for insertion therein upon relative axial movement therebetween, means for oscillating said spindle as an incident to said relative axial movement of said spindle and said tool to secure mating engagement of said drive elements, and means for controlling said oscillations including means for starting and stopping spindle oscillations responsive to axial movement of said spindle and means for selectively timing said periods of spindle advance and return and said periods of delay between said advance and return motions.

3. In a machine tool including an axially movable, rotatable spindle adapted to receive a cutting tool, said spindle and cutting tool having a multiplicity of closely spaced mating drive teeth respectively, and means for mechanically changing tools in said spindle including means for holding a tool in alignment with said spindle for insertion therein upon relative axial movement therebetween, the combination comprising, power means for oscillating said spindle with periods of delay between advance and return motions simultaneously with relative axial movement of said spindle and said tool to secure mating engagement of said drive teeth, and control means for starting and stopping said power means responsive to axial movement of said spindle.

4. In a machine tool including an axially movable, rotatable spindle adapted to receive a cutting tool, said spindle and tool having a multiplicity of closely spaced mating drive teeth respectively, and means for mechanically changing tools in said spindle including means for holding a tool in alignment with said spindle for insertion therein upon relative axial movement therebetween, the combination comprising, power means for oscillating said spindle with periods of delay between advance and return motions and as an incident to said relative axial movement of said spindle and said tool to secure mating engagement of said drive teeth, control means for stopping said power means responsive to axial movement of said spindle, and means for adjusting the time duration of said periods of delay.

5. In a machine tool including an axially movable, rotatable spindle adapted to receive a cutting tool, said spindle and cutting tool having a multiplicity of closely spaced mating drive elements respectively, and means for mechanically changing tools in said spindle including means for holding a tool in alignment with said spindle for insertion therein upon relative axial movement therebetween, the combination comprising, power means for rotating said spindle in pulsed increments with periods of delay between increments of rotation incident to relative axial movement of said spindle and said tool to secure mating engagement of said drive elements, and control means associated with said power means for adjusting said periods of delay and for stopping said power means responsive to axial movement of said spindle.

References Cited by the Examiner

UNITED STATES PATENTS

| | | | |
|---|---|---|---|
| 1,442,659 | 1/1923 | Groene | 29—568 |
| 2,685,823 | 8/1954 | Kaiser | 90—11.1 |
| 3,136,563 | 6/1964 | Swanson | 29—568 |
| 3,151,505 | 10/1964 | Lehmkuhl | 77—36 |
| 3,200,492 | 8/1965 | Lehmkuhl | 29—568 |

RICHARD H. EANES, Jr., *Primary Examiner.*